US012450871B2

(12) United States Patent
Mopur et al.

(10) Patent No.: US 12,450,871 B2
(45) Date of Patent: Oct. 21, 2025

(54) ENABLING FEATURE IMPORTANCE USING SIAMESE AUTOENCODERS FOR EFFECTIVE IMAGE CHANGE DETECTION

(71) Applicant: HEWLETT PACKARD ENTERPRISE DEVELOPMENT LP, Houston, TX (US)

(72) Inventors: Satish Kumar Mopur, Bangalore (IN); Gunalan Perumal Vijayan, Bangalore (IN); Shounak Bandopadhyay, Bangalore (IN); Krishnaprasad Lingadahalli Shastry, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 713 days.

(21) Appl. No.: 17/707,612

(22) Filed: Mar. 29, 2022

(65) Prior Publication Data

US 2023/0316710 A1    Oct. 5, 2023

(51) Int. Cl.
  *G06V 10/762*  (2022.01)
  *G06N 3/045*  (2023.01)
  (Continued)

(52) U.S. Cl.
  CPC .......... *G06V 10/763* (2022.01); *G06N 3/045* (2023.01); *G06V 10/776* (2022.01); *G06V 10/82* (2022.01)

(58) Field of Classification Search
  CPC .... G06V 10/763; G06V 10/776; G06V 10/82; G06V 10/762; G06V 10/761;
  (Continued)

(56) References Cited

U.S. PATENT DOCUMENTS

2017/0098138 A1*  4/2017  Wang .............. G06F 18/24137
2019/0019058 A1*  1/2019  Woodbridge ........ G06V 10/768
(Continued)

FOREIGN PATENT DOCUMENTS

CN        110853069 A     2/2020

OTHER PUBLICATIONS

Deng et al., "ArcFace: Additive Angular Margin Loss for Deep Face Recognition", Journal of LATEX Class Files, vol. 14, No. 8, Aug. 2015, 17 pages.
(Continued)

*Primary Examiner* — Umair Ahsan
(74) *Attorney, Agent, or Firm* — Dickinson Wright

(57) ABSTRACT

Systems and methods are provided for implementing a Siamese neural network using improved "sub" neural networks and loss function. For example, the system can detect a granular change in images using a Siamese Neural Network with Convolutional Autoencoders as the twin sub networks (e.g., Siamese AutoEncoder or "SAE"). In some examples, the loss function may be an adaptive loss function to the SAE network rather than a contrastive loss function, which can help enable smooth control of granularity of change detection across the images. In some examples, an image separation distance value may be calculated to determine the value of change between the image pairs. The image separation distance value may be determined using an Euclidean distance associated with a latent space of an encoder portion of the autoencoder of the neural networks.

20 Claims, 14 Drawing Sheets

(51) Int. Cl.
*G06V 10/776* (2022.01)
*G06V 10/82* (2022.01)

(58) Field of Classification Search
CPC .... G06N 3/045; G06N 3/0464; G06N 3/0895; G06N 3/0455; G06T 7/0002
See application file for complete search history.

(56) References Cited

U.S. PATENT DOCUMENTS

| | | | |
|---|---|---|---|
| 2019/0251446 A1* | 8/2019 | Fang | G06N 3/084 |
| 2020/0379454 A1 | 12/2020 | Trinh et al. | |
| 2022/0076053 A1* | 3/2022 | Gulsun | G06N 3/045 |
| 2022/0164582 A1* | 5/2022 | Raghavan | G06F 18/2115 |

OTHER PUBLICATIONS

Goel, Shubham, "Change Detection using Siamese Networks How do you measure change with the help of CNNs", available online at <https://towardsdatascience.com/change-detection-using-siamese-networks-fc2935fff82>, Jul. 21, 2020, 8 pages.

Lau Suki, "Learning Rate Schedules and Adaptive Learning Rate Methods for Deep Learning", available online at <https://towardsdatascience.com/learning-rate-schedules-and-adaptive-learning-rate-methods-for-deep-learning-2c8f433990d1>, Jul. 29, 2017, 11 pages.

Nayyeri et al., "Adaptive Margin Ranking Loss for Knowledge Graph Embeddings via a Correntropy Objective Function", Jul. 9, 2019, 7 pages.

Warnes, Zachary, "Hyperparameter Tuning—Always Tune your Models", available online at <https://towardsdatascience.com/hyperparameter-tuning-always-tune-your-models-7db7aeaf47e9>, Jul. 7, 2021, 9 pages.

Yavariabdi et al., "Change Detection in Multispectral Landsat Images Using Multi-Objective Evolutionary Algorithm", IEEE Geoscience and Remote Sensing Letters, Jan. 2017, 6 pages., Jul. 11, 2022.

Dayan, I. et al., "Federated Learning for Predicting Clinical Outcomes in Patients with COVID-19," Oct. 2021, Nature Medicine, vol. 27 pp. 1735-1743, https://www.nature.com/articles/s41591-021-01506-3.

Dey, S. et al., "SigNet: Convolutional Siamese Network for Writer Independent Offline Signature Verification," Sep. 30, 2017, https://arxiv.org/abs/1707.02131.

Flores, M., "Medical AI Needs Federated Learning, So Will Every Industry," Sep. 15, 2021, NVIDIA Blog, https://blogs.nvidia.com/blog/2021/09/15/federated-learning-nature-medicine/?ncid=so-nvsh-984623#cid=ix03_so-nvsh_en-us.

Li, M. D. et al., "Siamese Neural Networks for Continuous Disease Severity Evaluation and Change Detection in Medical Imaging," 2020, NPJ Digital Medicine, https://www.nature.com/articles/s41746-020-0255-1.pdf.

Utkin, L. V. et al., "A Siamese Autoencoder Preserving Distances for Anomaly Detection in Multi-Robot Systems," 2017, Int'l Conference on Control, Artificial Intelligence, Robotics & Optimization, https://ieeexplore.IEEE.org/document/8252959.

* cited by examiner

ENABLING FEATURE IMPORTANCE USING SIAMESE AUTOENCODERS FOR EFFECTIVE IMAGE CHANGE DETECTION

BACKGROUND

In Artificial Intelligence (AI) environments, a data expert can use Machine Learning (ML) techniques depending on use cases, such as classification or regression, to build and fit ML models. The ML models are trained with labelled data, and followed by a validation procedure for qualifying performance to arrive at a reasonably generalized ML model. The expert evaluates several models, refines the ML models through tuning parameters, and deploys a final ML model for performing analytics on input data streams, at production environments.

As an example, edge computing is utilized as a distributed, open Information Technology (IT) architecture that features decentralized processing power, enabling, for example, mobile computing and Internet of Things (IoT) technologies. With the proliferation of computing devices at the edge, analytics of the mass data collected by these devices is possible using various methodologies, including ML algorithms. Because the edge devices may have a limited amount of data processing capability, only a limited amount of analytics of the mass data is performed on the edge systems. A major portion of analytics of the mass data is performed at servers that are usually present over cloud networks, due to immense data processing capability of such servers. Therefore, in most implementations, such as for IoT technologies, the training environments are set over cloud networks, and the edge systems are used as production environments.

In some applications, at the cloud servers, the analysis being performed on the gathered data can be used to train the ML models. Various algorithms can improve the functioning of the edge systems, as defined by certain parameters. However, in real-world applications, dynamic behaviors of systems may impact decision-making of the ML models. Dynamic behaviors may come from various sources, including sensor inefficiency, denaturing of sensors, transient changes in measured parameter, and any introduction of new parameters to be analyzed.

The dynamic behaviors may appear in the data as anomalies, outliers, or drifts. For example, a drift can occur on input data streams or predicted output data, or a concept shift can occur in a relationship between input data streams and outputs, over a period of time. "Drift" may refer to the statistical properties of a target variable (which the ML model is trying to predict) that can change over time in unforeseen ways. The change over time can cause the predictions to become less accurate over time. "Anomalies" and "outliers" may refer to data items that deviate significantly from the majority of the other data items. These anomalies or outliers can occur because of noise or unexpected data points that influences model prediction behavior and may perform deeper examination.

Outliers present in input data streams and data stream drifts could affect prediction behavior of ML models which are pre-trained using labelled data.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
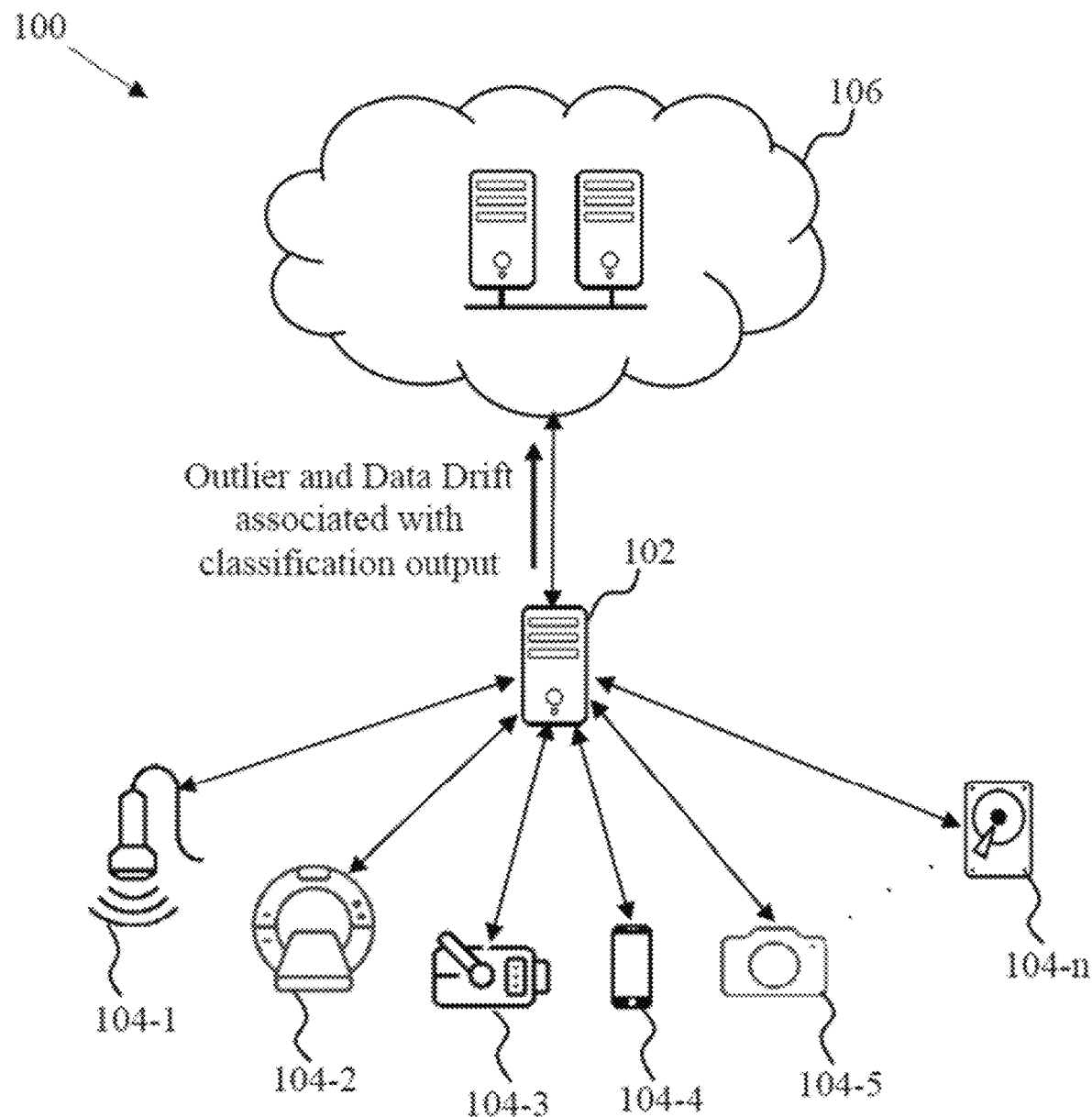
FIG. 1 illustrates a network connection diagram of a system for updating a Machine Learning (ML) model for image classification, in accordance with an example of the present disclosure.

The figures are not exhaustive and do not limit the present disclosure to the precise form disclosed.

DETAILED DESCRIPTION

In training environments such as those hosted on cloud servers, machine learning techniques such as classification or regression are used to train Machine Learning (ML) models with labelled data. Once trained, the ML models are validated so that the ML models provide required performance, and then deployed on devices hosting production environments (such as edge devices) to predict events or values associated with the events. The predictions can be used in forecasting or decision making contexts or applications, or other intended purposes. ML models developed using machine learning techniques are used in several technological domains to understand data patterns from images or time series data. For example, machine learning can be used to augment or assist with image processing for several applications in the healthcare domain, such as for diabetic retinopathy grading, fracture detection, cataracts, and chest diseases to name a few.

Similarity detection is a particular image processing technique that can identify common portions of images using one or more machine learning techniques described herein, including through a Siamese AutoEncoder. A Siamese AutoEncoder is an artificial intelligence (AI) or machine learning (ML) model (used interchangeably) implemented using a neural network architecture that consists of two or more identical "sub" neural networks, where each sub neural network can each generate a feature vector on the input data and compare the vectors to identify similarities or differences between them. For example, each of the identical neural networks can employ a Convolutional Neural Networks (CNN) as the "sub" neural networks. Each of the neural networks can take one of two input images and be trained to differentiate between the two inputs by learning the similarity between them. Once each neural network is trained, the neural network may classify whether the two images are the same or different. This approach enables classification of whether two input images are similar or dissimilar using a similarity score classification (e.g., as a binary output), and may not be effective for granular change detection.

Additionally, a loss function technique may be implemented during the training process. For example, a contrastive loss may be implemented with an image distance computation, such as Euclidean distance. When the contrastive loss is implemented, the "sub" neural networks may generate a similarity value that measures zero to one for each image classification. When the similarity value is close to one, the neural network may identify similar images, whereas a similarity value close to zero may identify dissimilar images. The similarity may be determined, for example, by comparing the similarity value to a threshold value. This approach may enable the classification of two input images as being either similar or dissimilar using a similarity value classification, but may not be effective in determining a granular change to a portion of the image.

Examples of the application can implement a Siamese AutoEncoder using improved sub neural networks and loss function. For example, the system can detect a granular change in images using a Siamese Neural Network with Convolutional Autoencoders as the twin sub networks (e.g., Siamese AutoEncoder or "SAE"). In some examples, the loss function may be an adaptive loss function that incorporates an adaptive margin computation over a regular contrastive loss, which can help enable smooth control of granularity of change detection across the images. In some examples, an image separation distance value may be calculated to determine the value of change between the image pairs. The image separation distance value may be determined using a Euclidean distance associated with a latent space of an encoder portion of the autoencoder of the neural networks.

In some examples, the contrastive loss function is implemented with a dynamically computed adaptive margin, across each epoch (e.g., epoch corresponding with a hyperparameter that defines a number times that the learning model will use the entire training dataset), for granular change detection. A distance computation may be implemented with the loss function (e.g., using cosine similarity with a Euclidean distance). This may help incorporate an uneven distribution of vector values in the calculation using an angle-based assessment to enable smooth granularity of change (or dissimilarity) detection across images compared to a reference image.

Additionally, to prevent degradation of ML models due to the above said reasons, the system can detect data drift and outliers by applying data processing techniques on images received at the device hosting the production environment. For example, a deep learning network (e.g., a Convolutional Neural Network or CNN) may be used for training a Machine Learning (ML) model with image training data for classification. Further, an autoencoder is trained at a device hosting a training environment i.e. a cloud server, using the image training data used to train the ML model, without any anomalies. The autoencoder is trained until it is able to reconstruct expected output with minimum losses i.e. reconstruction errors. The autoencoder output data comprising stabilized error (loss) values after training within the watermarks is called baseline data and is used as reference. The baseline data is used as a reference for drift analysis in a device hosting a production environment i.e. at edge devices. The baseline data can be continuously refined based on stabilized error values generated in the production environment.

In post training, the autoencoder and the ML model may be deployed on the device hosting the production environment. Upon deployment, the autoencoder may reconstruct images received by the device hosting the production environment. The image may be received from an image capturing device, such as a medical apparatus. During operation of the autoencoder, data losses occurring during reconstruction of the images are captured as reconstruction errors. The reconstruction errors are stored with timestamps and unique tags associated with corresponding images.

Data points representing the reconstruction errors may be clustered using affinity propagation. For the clustering operation, the data points may be supplied in batches of a predefined tunable size. Affinity propagation may perform the clustering operation based on a preference value that indicates likelihood of a data point to represent a cluster of data points. An important characteristic of current disclosure includes dynamically setting the preference value by applying linear regression on the data points, so that the clustering operation may perform efficiently to produce an optimum number of clusters.

Upon formation of clusters of the data points using affinity propagation, outliers may be determined based on one or more factors, such as maximum distance from one or more densely populated clusters, count of values of the data points, and comparison of the values with predefined watermarks in baseline data. Further, data drift is identified based on changes in densities of the clusters, over a predefined period of time. The changes in densities of the clusters are determined through histogram analysis and/or auto-correlation across cluster densities.

The ML model deployed on the device hosting the production environment classifies the received images into one or more categories. Thereupon, classification output of the ML model is associated with the outliers and the data drift to form a data package. The data package is transmitted to a device hosting a training environment where the data package is used for fine tuning of the ML model.

Technical improvements are realized throughout the disclosure. For example, the proposed system can improve machine learning for image recognition using a Convolutional Autoencoder with a novel loss function and an autoencoder latent space-based distance measurement. The system can determine granular changes in images, anomalies, and enables categorical grouping of similar images.

Any reference of a specific application in current disclosure, such as the medical application, is merely provided for the ease of explanation and should not be construed as a limiting factor for application of the methodologies described herein. Therefore, it is fairly possible for a person skilled in the art to utilize the details provided in current disclosure for any similar application.

FIG. 1 illustrates a network connection diagram 100 of a system for updating a Machine Learning (ML) model. Edge device 102 is shown to be connected with image sources 104-1 to 104-n (collectively referred as an image source 104). In some examples, edge device 102 indicates a device hosting a production environment. For example, as illustrated in FIG. 1, image source 104 may be a medical apparatus such as an ultrasound scanner 104-1, Computerized Tomography (CT) scan machine 104-2, and a portable X-ray machine 104-3, a handheld user device such as a smartphone 104-4, a digital camera 104-5, or a data storage device such as a Hard Disk Drive (HDD) 104-n.

Figure 2:
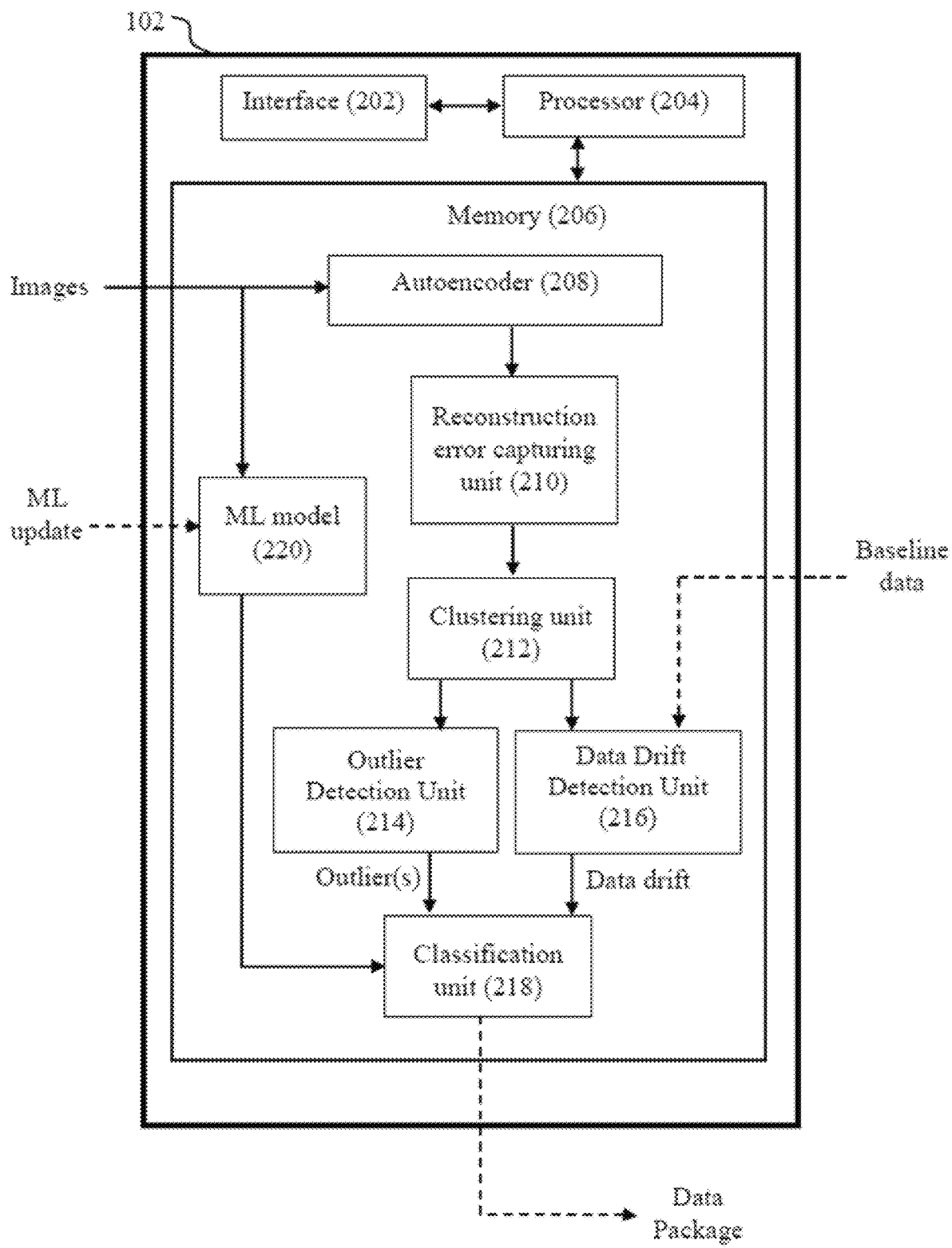
FIG. 2 illustrates a block diagram showing different components of a device for hosting a production environment for updating an ML model for image classification, in accordance with an example of the present disclosure.

FIG. 2 provides an illustrative example of edge device 102. For example, edge device 102 may comprise ML model 220 that receives data (e.g., images) to run or analyze through the ML model. ML model 220 may be trained using images received from image source 104 or other similar images. For training ML model 220, the images may be transmitted to cloud server 106 connected to edge device 102, through a communication network. It must be understood that within successive passes of description, cloud server 106 indicates a device hosting a training environment. After ML model 220 (explained later with reference to FIG. 2 and FIG. 5) is trained at cloud server 106, ML model 220 may be deployed at edge device 102, to process new images that may be received from image source 104.

Post deployment of ML model 220 on edge device 102, when the new images include varying information compared to the images used to train ML model 220, relevant information may be extracted at edge device 102. In an aspect, edge device 102 may receive the new images from image source 104. The images may be provided to an autoencoder for reconstruction. Data losses occurring during reconstruction of the images may be captured as reconstruction errors.

Data points corresponding to the reconstruction errors may be clustered using a suitable clustering technique, such as affinity propagation. Clusters of the data points may be used to determine outliers, based on one or more rules. Further, data drift may be determined by identifying changes in densities of the clusters over a predefined period of time. ML model 220 may classify the new images provided to edge device 102. Classification output of ML model 220 may be associated with the outliers and the data drift, and forwarded to cloud server 106, for refining/updating ML model 220.

FIG. 2 illustrates a block diagram showing different components of edge device 102, in accordance with an example of the present disclosure. Edge device 102 may comprise an interface 202, a processor 204, and a memory 206. The memory 206 may comprise various units including an autoencoder 208, reconstruction error capturing unit 210, clustering unit 212, outlier detection unit 214, data drift detection unit 216, and a classification unit 218. These units configured within the memory 206 may be loosely coupled to provide a data processing pipeline. The units being loosely coupled means that functioning of each unit may be independent with respect to functioning of remaining unit, and reconfiguration or replacement of any unit may not affect the processing or outcome of remaining units.

To update ML model 220 deployed on edge device 102, at first, images received from one or more image sources 104 may be provided to autoencoder 208. It should be noted that autoencoder 208 may be trained on cloud server 106 before being implemented on edge device 102. Details related to training of autoencoder 208 are provided in later section, with reference to FIG. 5.

Autoencoder 208 may be implemented, for example, using an unsupervised artificial neural network. Autoencoder 208 is pre-trained on the cloud server 106 to efficiently compress and encode image data and then reconstruct the image data back from its compressed and encoded representation. The image data is reconstructed such that it is as close as possible to the image data provided to autoencoder 208. During the process of compression, encoding, and reconstruction, autoencoder 208 learns to compress the image data into fewer dimensions, wherein encoded representation of the image data is present in a latent space.

While autoencoder 208 reconstructs the images received from one or more image sources 104, reconstruction error capturing unit 210 captures reconstruction errors i.e. losses occurring during reconstruction of each of the images, over a period of time. Therefore, each reconstruction error corresponds to loss of information in a reconstructed image compared to a corresponding original image. The reconstruction errors may be stored with timestamps and/or tags associated with corresponding images.

Data points corresponding to the reconstruction errors are provided to clustering unit 212 for clustering using a suitable clustering technique. In one preferred implementation, affinity propagation may be used to cluster the data points. The data points may be supplied in batches of a predefined tunable size, for the clustering. Therefore, the clustering technique would produce clusters of the data points supplied in batches. It must be noted that one particular advantage of using affinity propagation for clustering includes doing away with the requirement to define number of clusters to be prepared. Because cluster count can be dynamic across the batches during presence of outliers and data drift, leaving initialization of the number of clusters for affinity propagation may serve the purpose.

Affinity propagation works on the principle of determining similarities between data points, and prepares clusters by maximizing total similarity between the data points and their exemplars. An exemplar may correspond with a point that represents a cluster. During the clustering, the data points may send messages to each other until convergence is achieved.

For example, processing N samples of data points $d_i$ and $d_k$ to produce a cluster (represented as an N×N matrix) may include determining a similarity value (stored as a similarity matrix $S(i, j)$) between the data points $d_i$ and $d_k$. A diagonal of S, including i.e. $S(i, i)$, may represent input preference. Such input preference, referred henceforth as a preference value, indicates likelihood of a data point to become an exemplar. The preference value controls the number of clusters that would be produced through affinity propagation, and therefore, may be initialized. The preference value may be set carefully because setting the preference value close to a minimum possible similarity value can result in generating fewer clusters, while setting the preference value greater than or equal to a maximum possible similarity value can result in generating numerous clusters.

In one example, an optimal preference value is dynamically determined by applying linear regression on the data points. During the process, trending may be performed for each batch of data points representing the reconstruction errors, to determine the preference value dynamically. A large slope identified during the trending can be indicative of a spread-out of the data points by a large distance, while a small slope can be indicative of closer set of the data points having lesser distance between them. To achieve an equilibrium, the optimal preference value is calculated dynamically between zero and a minimum similarity, from the similarity matrix S, giving a range of clusters based on distance between the data points. This would ensure an optimal cluster count with an appropriate data point density.

A detailed manner of dynamically determining the optimal preference value is now described. At first, linear regression is performed on a batch of data points, and a parameter indicating goodness of fit (r_scor) is determined. This parameter indicates whether the data points examined through linear regression are having a high affinity or a scatter. A good fit may indicate that the data points could be clustered into less number of clusters, and a bad fit may indicate that the data points could be clustered into more number of clusters. Successively, a slope (m) and a slope angle (theta) of a line fitting the ML models are determined. Then, a minimum value and a median value are extracted from the similarity set/matrix S. Post such calculations, the optimal preference value may be determined based on comparison of the goodness of fit (r_scor) with predefined threshold values. For example, in one implementation, the goodness of fit (r_scor) may be compared with a first threshold value of 0.7 and a second threshold value of 0.3. It must be understood that the threshold values 0.7 and 0.3 are practical examples, and exposed as variables for user tuning to control granularity of cluster density. In other words, the granularity of change can be controlled by a user through tunable features provided via a user interface. In one case, when the goodness of fit (r_scor) is greater than the first threshold value i.e. r_scor>0.7, the optimal preference value may be determined as minimum value+theta*((median value−minimum value)/(90 degrees)). In another case, when the goodness of fit (r_scor) is less than or equal to the first threshold value and greater than or equal to the second threshold value i.e. r_scor<=0.7 and r_scor>=0.3, the optimal preference value may be set as the median value. In yet another case, when the goodness of fit (r_scor) is less than or equal to the second threshold value and greater than zero i.e. r_scor<=0.3 and r_scor>0, the optimal preference value may be set as half of the median value. In this manner, the optimal preference value is set dynamically through linear regression, and the clustering unit 212 efficiently and accurately clusters the data points through affinity propagation using the optimal preference value.

Clusters of the data points prepared by clustering unit 212 may be provided to outlier detection unit 214. Outlier detection unit 214 determines outliers from the clusters, based on one or more factors including maximum distance from one or more densely populated clusters, count of values of the data points, and comparison of the values with watermarks predefined in baseline data. The baseline data indicates an output of autoencoder 208 produced on cloud server 106, and comprises stabilized error (loss) values obtained after autoencoder 208 is trained within an upper water mark and a lower water mark. Watermarks indicate referential error value, and could be adjusted by a user/operator.

Figure 3A:
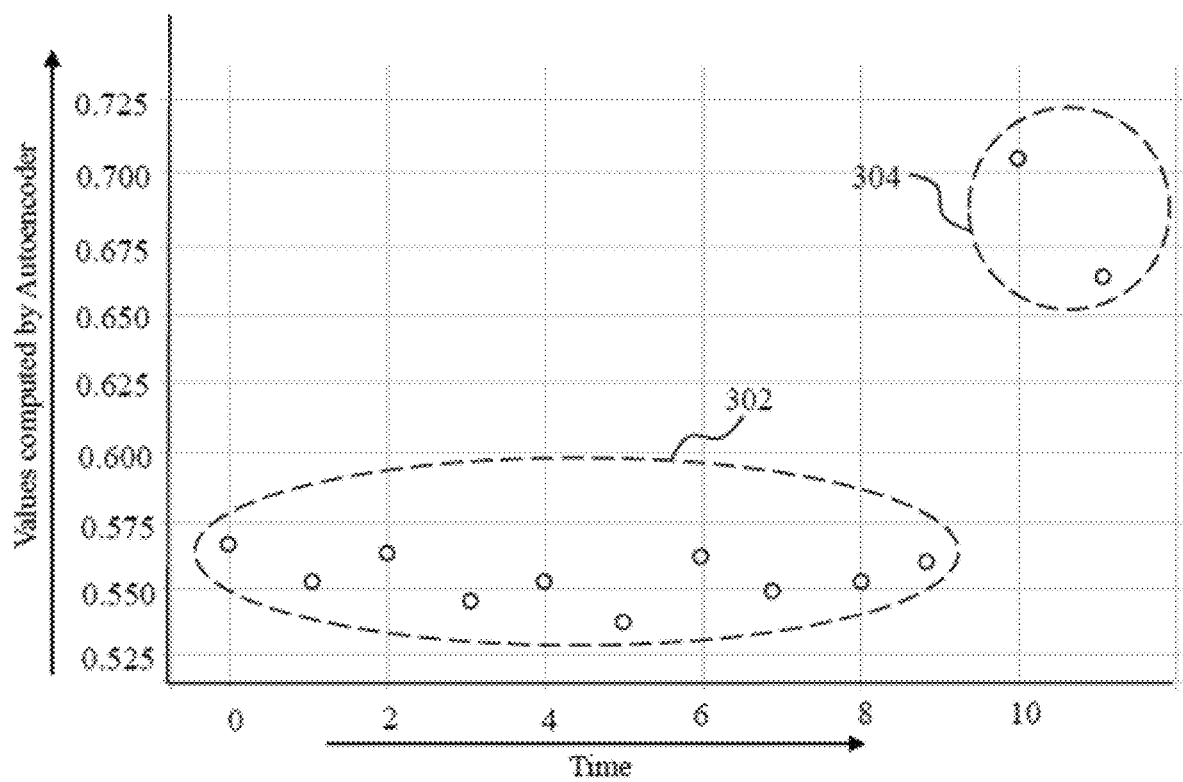
FIG. 3A illustrates clusters prepared from reconstruction errors corresponding to a first batch of images, in accordance with an example of the present disclosure.
Figure 3B:
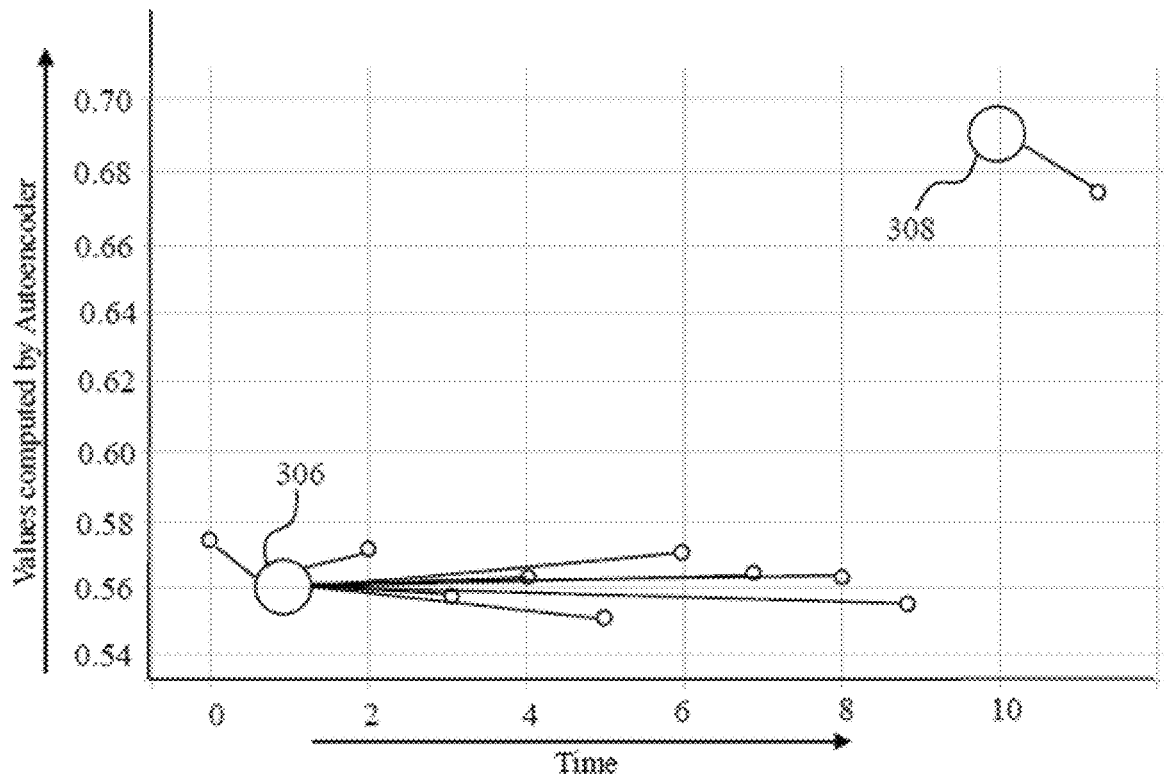
FIG. 3B illustrates a sample representation of clusters prepared for the first batch of images through affinity propagation, using an optimal preference value, in accordance with an example of the present disclosure.

FIG. 3A illustrates clusters 302 and 304 prepared from reconstruction errors corresponding to a first batch of images. Cluster 302 could be seen as a densely populated cluster including several data points. Cluster 304 could be identified as an outlier cluster for being present far from the densely populated cluster i.e. cluster 302. FIG. 3B illustrates a sample representation of clusters prepared through affinity propagation, using the optimal preference value. The data points in a first cluster could be seen to be linked with exemplar 306. Similarly, in a second cluster, a single data point could be seen connected with exemplar 308.

In one example, the data drift detection unit 216 detects data drift by assessing densities of the clusters in a temporal manner. A change in density of cluster with reference to the baseline data, for a period of time, is indicative of data drift i.e. deviation in data pattern. The change in density of each cluster is determined using auto-correlation, such as Pearson's correlation.

Figure 4A:
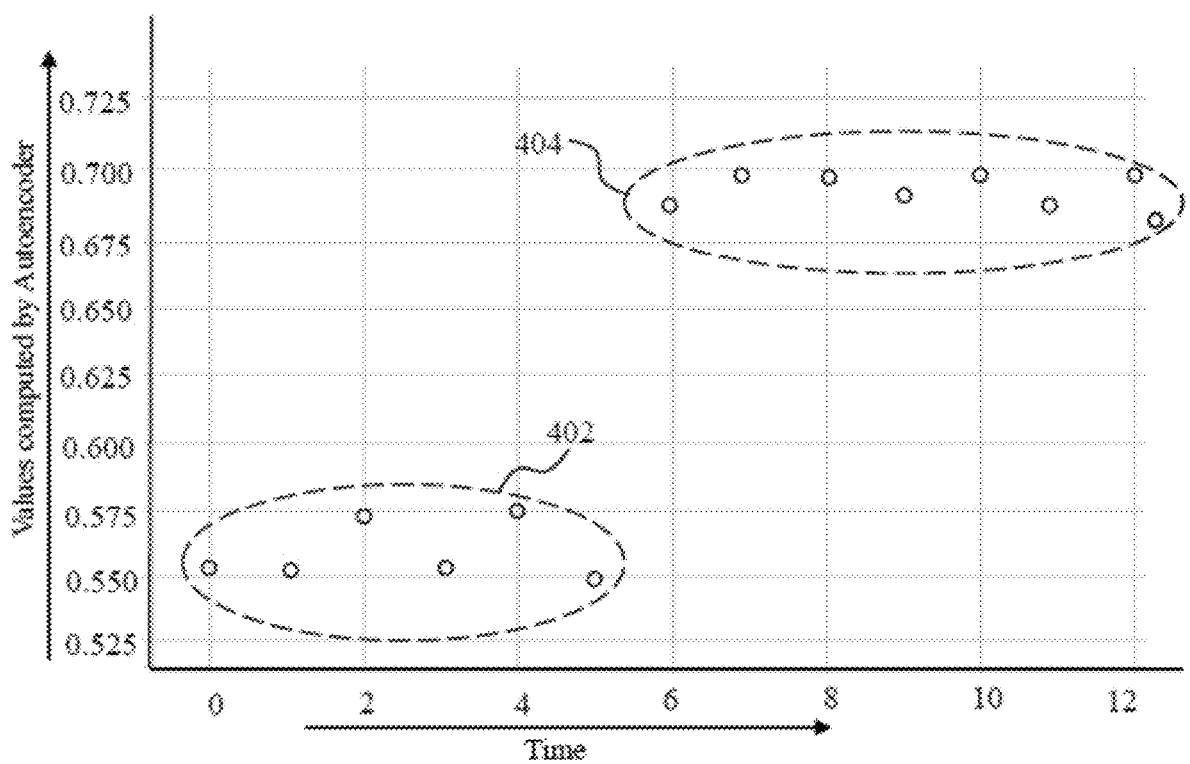
FIG. 4A illustrates clusters prepared from reconstruction errors corresponding to a second pair/batch of images, in accordance with an example of the present disclosure.
Figure 4B:
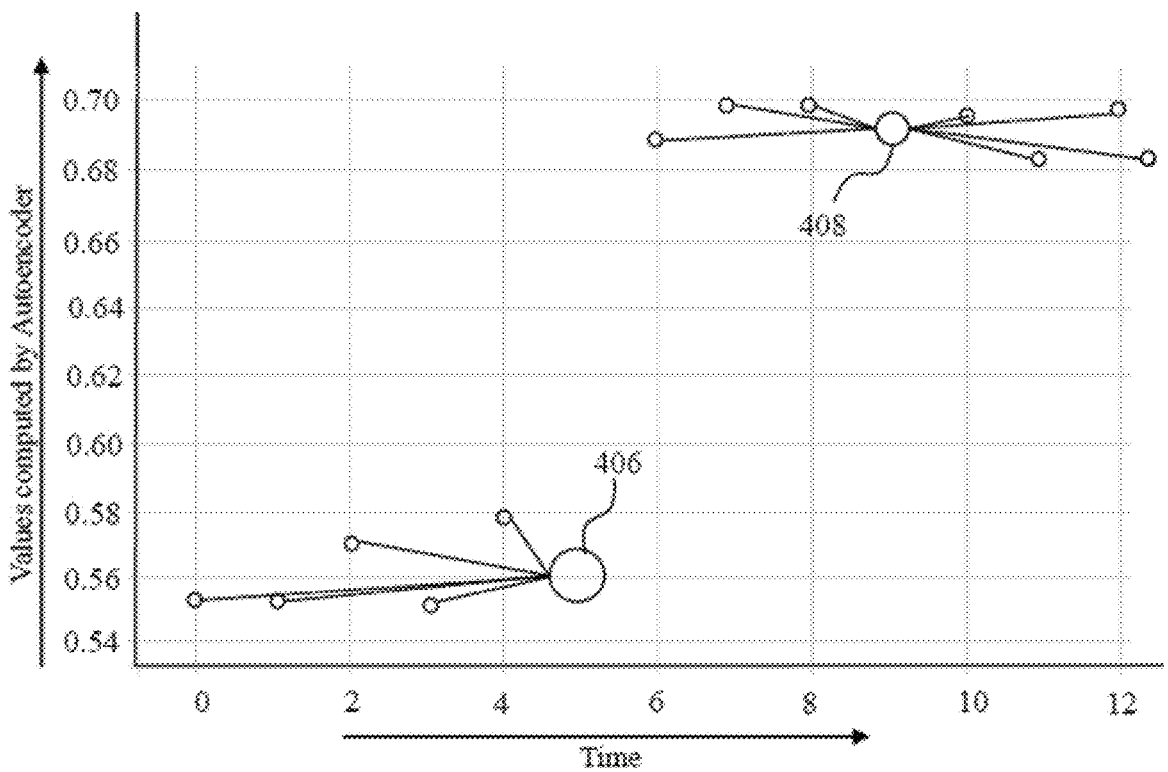
FIG. 4B illustrates a sample representation of clusters prepared for the second pair/batch of images through affinity propagation, using an optimal preference value, in accordance with an example of the present disclosure.

FIG. 4A illustrates clusters 402 and 404 prepared from reconstruction errors corresponding to a second pair/batch of images. Comparing the clusters 402 and 404 with the clusters 302 and 304, change in cluster densities indicating the data drift could be easily observed. FIG. 4B illustrates a sample representation of clusters prepared through affinity propagation, using the optimal preference value. The data points in a first cluster could be seen to be linked with exemplar 406. Similarly, in a second cluster, data points could be seen to be connected with exemplar 408.

A detailed process of determining data drift is now described. At least some of the steps mentioned henceforth may be performed for each of the clusters created by the clustering unit 212. At first, density distribution of the data points within each of the clusters is derived using histogram analysis. Output of histogram analysis for each of the clusters is saved in a density set. Thereupon, auto-correlation is run across every two density sets and the baseline data created in a temporal manner. While performing the auto-correlation, if histogram counts of two density sets are different, imputation with '0' value is inserted into a density set having a lower count. Output obtained through auto-correlation is analyzed with reference to set threshold values, to determine the data drift. For example, a strong correlation greater than a threshold value would indicate a consistent density pattern. Alternatively, a weak positive correlation lesser than the threshold value would indicate a change in the density pattern. Further, a negative correlation would indicate a data pattern exhibiting significant drift in the density pattern. Finally, data drift may be identified in case the output obtained through auto-correlation is found to be monotonically decreasing, over a predefined time period.

In one example, the images provided to autoencoder 208 are also provided to ML model 220. ML model 220 classifies the images into one or more categories. Such classification output provided by ML model 220 is provided to classification unit 218. Classification unit 218 associates the classification output provided by ML model 220 with the outliers detected by outlier detection unit 214 and the data drift detected by data drift detection unit 216, to form a data package. The data package may include segregated information present in at least three categories i.e. the outliers/anomalies, data drift in classified images, and data drift in unclassified images. The data package may be transmitted to cloud server 106 for determining whether to update ML model 220 and, in turn, updating ML model 220.

Figure 5:
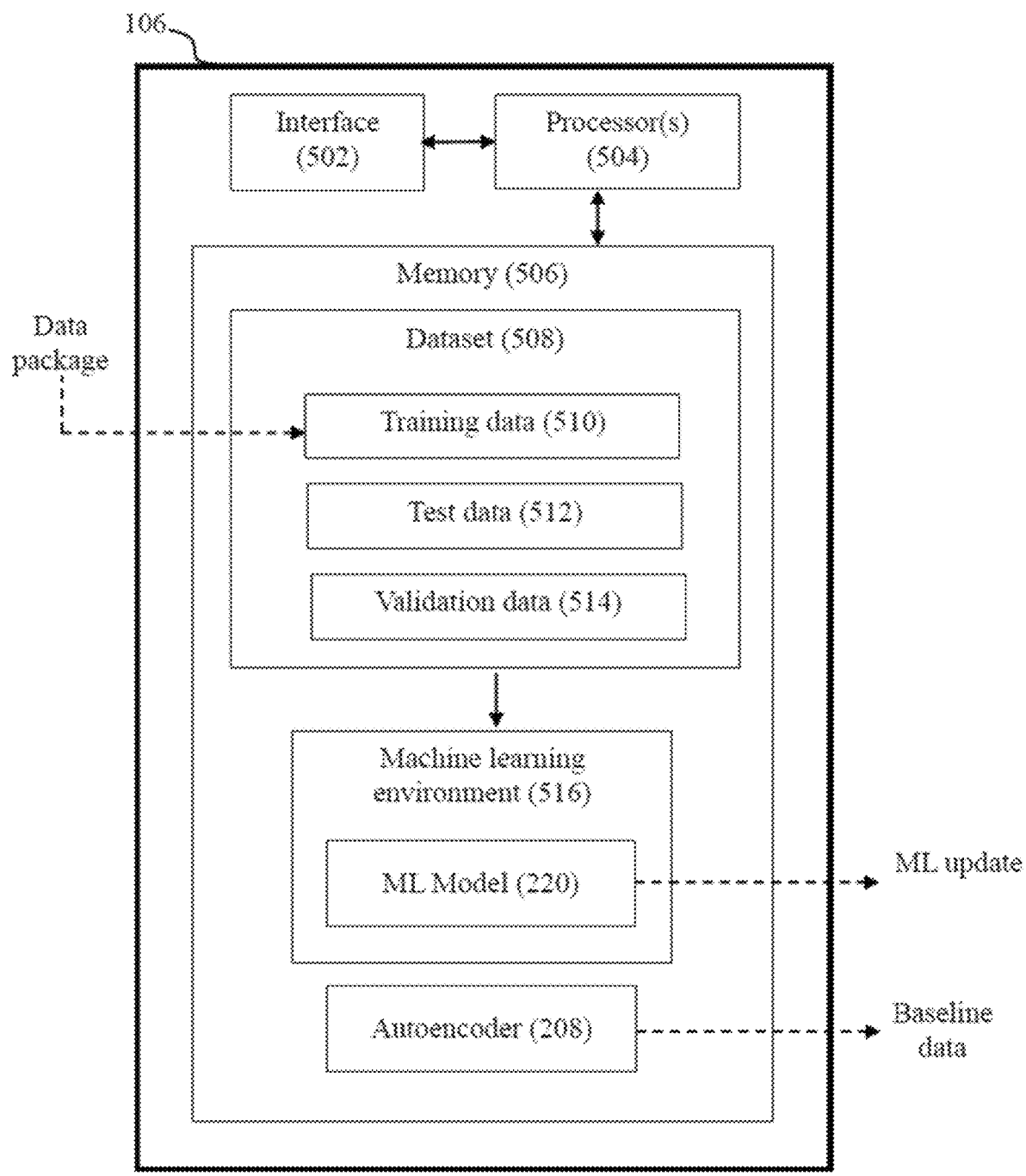
FIG. 5 illustrates a block diagram of a cloud server for updating an ML model for image classification, in accordance with an example of the present disclosure.

FIG. 5 illustrates a block diagram of cloud server 106 for training and updating ML model 220, in accordance with an example of the present disclosure. As illustrated, cloud server 106 may comprise an interface 502, processor(s) 504, and a memory 506. The memory 506 may include dataset 508 required for training the ML model 220, before being deployed on edge device 102. The dataset 508 includes training data 510, test data 512, and validation data 514. Using all such data i.e. the training data 510, the test data 512, and the validation data 514, ML model 220 is trained in a machine learning environment 516.

At cloud server 106, ML model 220 may be trained using the images received from image source 104 or other similar images. For example, if ML model 220 is required to detect pneumonia by processing X-ray images of chest region of patients, ML model 220 will be trained using X-ray images of patients that are known to be affected with pneumonia. In one implementation, deep learning networks, for example, Convolutional Neural Networks (CNNs), may be used for training the ML model 220. Once trained, ML model 220 may be deployed on edge device 102.

After deployment of ML model 220 on edge device 102, the data package is received at cloud server 106, as described above. The data package includes classification output of ML model 220 associated with the outliers and the data drift. The data package is used to supplement training data 510 using which ML model 220 may be updated during a fine tuning process. The data package may be assessed to determine if the data package comprises any essential information using which ML model 220 is to be updated or the data package includes unessential information that is to be discarded. For example, some information present in the data package exists sporadically, it could be identified as a noise or an error introduced by a sensor capturing images, and thus may be discarded. On the other hand, some other information present in the data package exists prominently, it could be identified as useful information using which ML model 220 to be updated.

In one implementation, weights of ML model 220 may be adjusted based on the information present in the data package, for updating ML model 220. After being updated, ML model update or updated ML model may be transmitted to edge device 102 for deployment.

The memory 506 also includes autoencoder 208 that is trained using the training data 510. Initially, before being deployed on edge device 102, autoencoder 208 is trained till it is able to reconstruct expected output (images) with minimum reconstruction errors. The reconstruction errors indicate loss values, and are determined as Mean Squared Error (MSE) output for the images re-constructed by autoencoder 208. Further, the minimum reconstruction errors correspond to a range of values present between an upper water mark and a lower water mark, tunable based on quality of reconstruction of the images. The baseline data is used as a reference for identifying data drift at edge device 102. Autoencoder 208 and the baseline data are both updated on the cloud server 106, using the data package received from edge device 102.

Accordingly, the above described system and method provide determining outliers and data drift at edge system using affinity clustering configured to determine optimum number of data clusters, associating classification output of an ML model with the outliers and the data drift, and communicating the associated information to a cloud server, for updating the ML model. Communicating only the associated information to the cloud server allows saving of time, bandwidth, and computing power required for updating ML models. The ML models updated using the data drift and the outliers associated with the classification output of an ML model would predict accurate outputs that could be used for decision making at an edge device.

Figure 6:
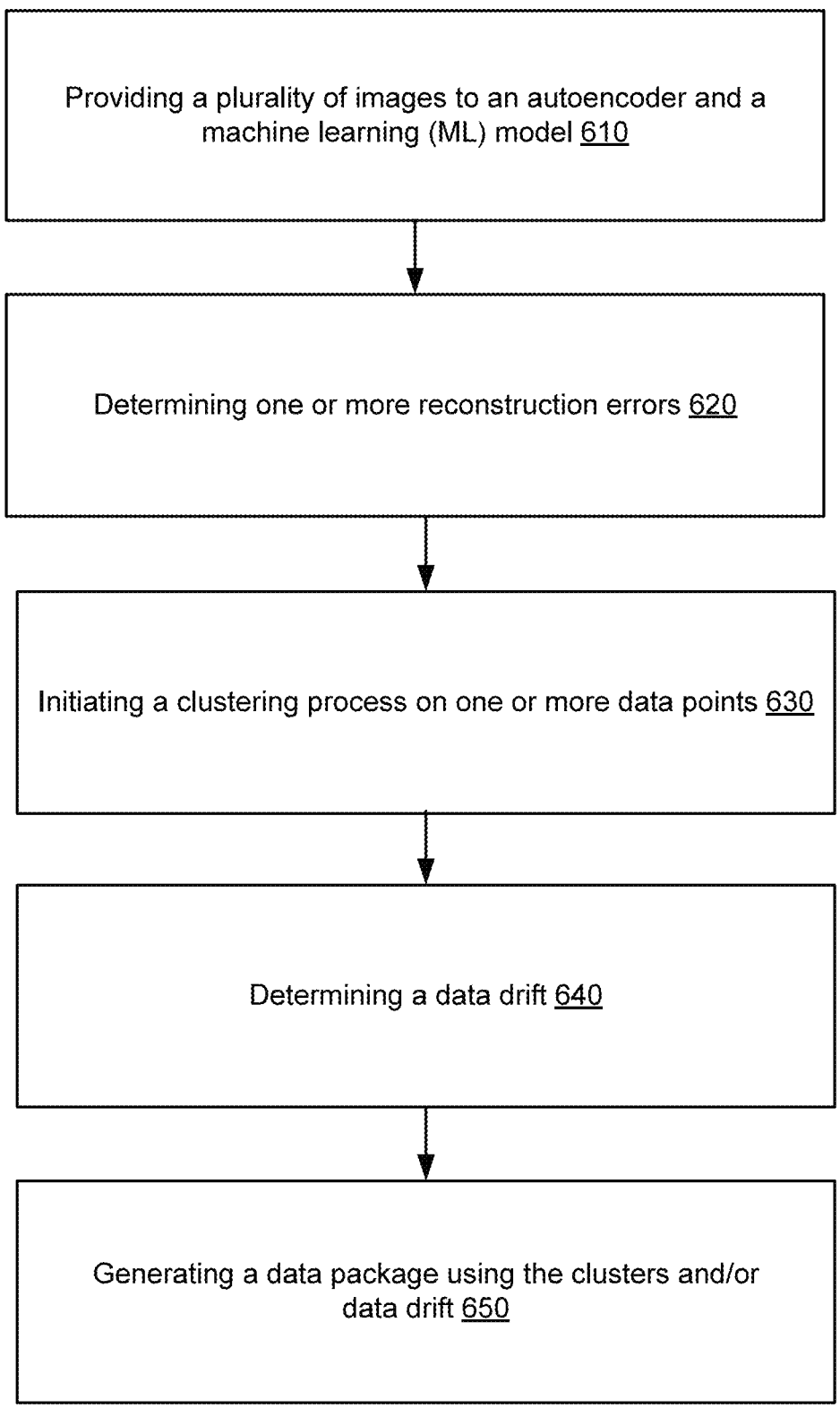
FIG. 6 illustrates a process for updating a machine learning model, in accordance with an example of the present disclosure.
Figure 7:
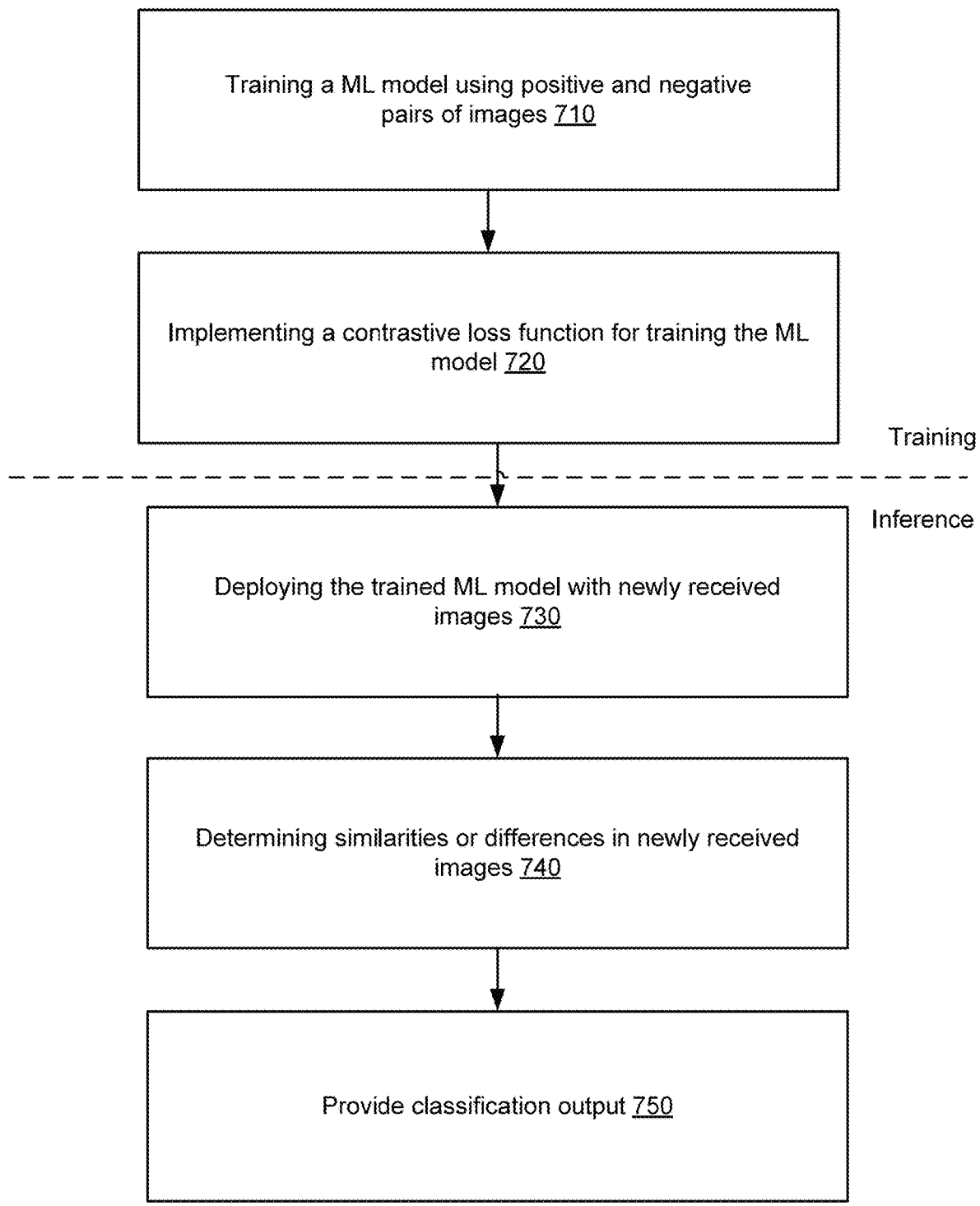
FIG. 7 illustrates a process for updating a machine learning model, in accordance with an example of the present disclosure.

Multiple methods of updating ML models are provided, as illustrated in FIGS. 6 and 7. For example, in FIG. 6 at block 610, a plurality of images is provided to an autoencoder and an ML model. Each of the autoencoder and the ML model may be pre-trained on similar training data, over a server. The autoencoder may be pre-trained over the server until it is able to reconstruct images with error values present within predefined tunable thresholds. Once implemented on an edge device, the autoencoder reconstructs the plurality of images, and the ML model classifies the plurality of images into one or more categories.

At block 620, one or more reconstruction errors may be determined for further processing. The reconstruction errors may occur during reconstruction of the plurality of images. The reconstruction errors may be stored with timestamps and tags associated with corresponding images. Data points representing the reconstruction errors may be supplied in batches of a predefined tunable size for clustering.

At block 630, a clustering process may be initiated. For example, the data points may be clustered using affinity propagation. A preference value used by the affinity propagation for determining a similarity between the data points is dynamically set by applying linear regression on the data points. The preference value indicates likelihood of a data point to represent a cluster of data points, and is dynamically set by performing trending of values of the reconstruction errors through linear regression. The preference value is dynamically set between zero and a minimum similarity value obtained from the similarity matrix S.

In some examples, outliers may be determined from clusters of the data points. For example, the outliers may be determined based on one or more factors including maximum distance from one or more densely populated clusters, count of values of the data points, and comparison of the values with predefined watermarks in baseline data. The baseline data can correspond to an output of the autoencoder trained at a cloud server, and comprises stabilized reconstruction error values.

At block 640, a presence of data drift may be determined. The presence of data drift may be based on changes in densities of the clusters over a predefined period of time. The changes in densities of the clusters may be determined through histogram analysis and/or auto-correlation across cluster densities.

At block 650, a data package may be generated. The data package may comprise the classification output of the ML model, the outliers, and/or the data drift. The data package may be used for fine tuning the ML model.

FIG. 7 illustrates an additional method of updating ML models. For example, in FIG. 7, an increased granular change detection process using an ML model is described. For example, the system may incorporate a feature importance assessment through the granular change detection with an anomaly and/or quality assessments in the image datasets. Using this information, the ML model may be retrained to identify one or more key features in each image. In some examples, the ML model may be continuously retrained.

Various ML models may be implemented, including a Siamese AutoEncoder, as previously discussed herein, or the system may be generalized to a Convolutional Neural Network or other ML model. When a Siamese AutoEncoder is implemented, the Siamese AutoEncoder may correspond with an artificial neural network that uses the same weights while working in tandem on two different input vectors to compute comparable output vectors. Often one of the output vectors is precomputed, thus forming a baseline against which the other output vector is compared At block 710, the ML model may be trained using similar processes described herein. For example, positive pairs and negative pairs of images may be provided to the ML model for training. The positive pair can comprise an anchor image and a similar image, and a negative pair can comprise an anchor image and a different image.

As an illustrative example in the healthcare setting, the positive pairs of images may belong to the same class of X Ray image dataset (e.g., [Normal, Normal]) with "Normal" being the anchor image. The negative pairs of images may include two images that belong to a different class (e.g., [Normal, Pneumonia]).

When training the ML model, the process may randomly sample examples of positive and negative pairs. These pairs may serve as the training data such that the ML model learns a similarity value across the dataset.

Figure 8:
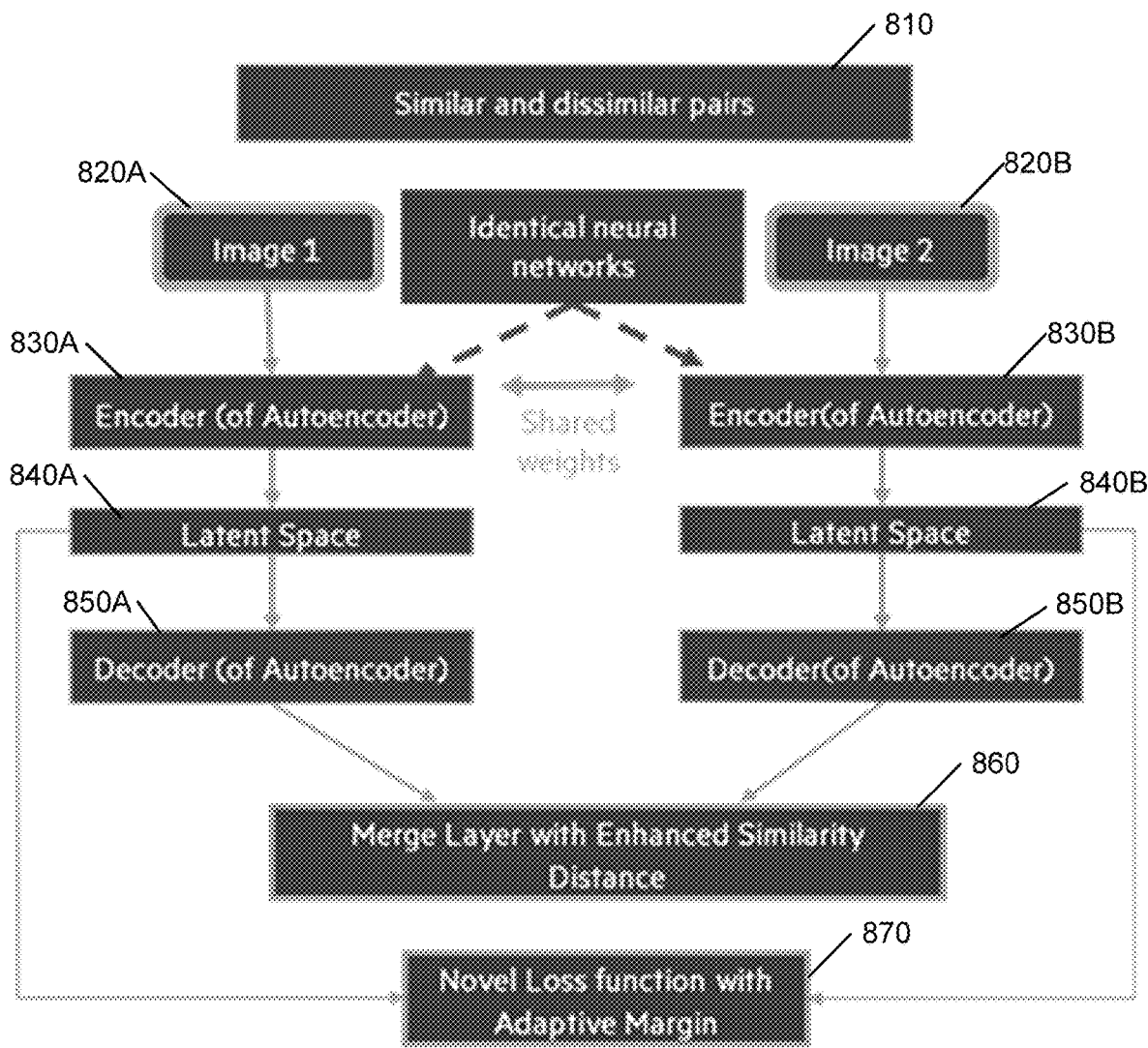
FIG. 8 illustrates training a machine learning model, in accordance with an example of the present disclosure.

An illustrative training process using a Siamese AutoEncoder is provided in FIG. 8. At block 810, the ML model may receive positive pairs and negative pairs of images. The positive pair can comprise an anchor image and a similar image, and a negative pair can comprise an anchor image and a different image.

At block 820 (illustrated as first neural network path block 820A and second neural network path block 820B), the pairs of images may be separated and provided to identical neural networks. For example, the two neural network paths may correspond with two identical neural networks (e.g., two CNNs, etc.), where each neural network may receive one of two input images. The neural networks can differentiate between the two input images by learning the similarity value between them with an objective to classify whether the two images are the same or different.

At block 830 (illustrated as first neural network path block 830A and second neural network path block 830B), each image may be provided to an encoder of the autoencoder or other unsupervised neural network. At the encoder, the process may learn how to compress and encode the image data and share the learned weights between the two paths. The encoder may reduce the input dimensions and compress the input image data into an encoded representation (e.g., vector data).

At block 840 (illustrated as first neural network path block 840A and second neural network path block 840B), latent space may be determined. For example, typical processes may determine a Euclidean distance, whereas this process may determine the latent space of the encoder portion from block 830 to determine the distance between the image data. The latent space value(s) may be used in the adaptive margin loss function later in the training process (at block 870).

At block 850 (illustrated as first neural network path block 850A and second neural network path block 850B), each image may be provided to a decoder of the autoencoder or other unsupervised neural network. At the encoder, the process may learn how to reconstruct the vector data back from the reduced encoded representation to a representation that is as close to the original input image data as possible.

At block 860, the decoded output images from the twin sub networks may be provided to a merge layer that computes the distance metric between the decoded output images using an enhanced similarity distance Ld. Ld is defined as Euclidean distance (e.g., between the decoded output images) multiplied by a Normalized (Cosine Similarity of Enc_latent_vector1 and Enc_latent_vector2)), where Enc_latent_vector1 and Enc_latent_vector2 correspond with the latent space numerical data from each Encoder of the twin autoencoder networks, illustrated at 830A and 830B.

At block 870 (and block 720 of FIG. 7), a loss function may be implemented with the training process. Various loss functions may be implemented. For example, one typical loss function may include a contrastive loss function that differentiates between similar and dissimilar images by contrasting the two input images given to the network during training. The desired objective is to achieve a small distance for positive pairs of images and a greater distance for negative pairs of images during training.

A first (contrastive) loss function may be defined as: Loss=$Y*d^2+(1-Y)*$maximum $(0, M-d)^2$, where Y=0 when the input image is from the same class; Y=1 when the input image is from different classes; M is a margin defining a radius such that dissimilar input pairs within this margin only will contribute to loss; and d is the Euclidean distance between the outputs of the twin networks. In some examples, the margin M is a fixed value>0 that makes the ML model act as classifier for similar and dissimilar images.

A second (adaptive margin) loss function may be defined as: for each epoch of a training run, a dynamically computed margin alternative direction method (AdM) across epochs may be determined using the following formula: Loss=$Y*Ld^2+(1-Y)\times$max $(0, AdM-Ld)^2$, where AdM=$M1+(M2-e^{((M1-2)\times(alpha/epoch\_count))})$. M1 and M2 are the upper and lower margin values, e.g., 0.1 to 1.0; epoch_count is the total number of epochs for the training run; alpha is a tunable less than epoch count for granularity of margin, controllable by a user (e.g., via a user interface); and, as described herein, Ld is a Euclidean distance*Normalized (Cosine Similarity (Enc_latent_vector1, Enc_latent_vector2)); and Enc_latent_vector1 and Enc_latent_vector2 are the latent space numerical data from each Encoder of the twin autoencoder networks. In some examples, the cosine similarity augments can be combined to add robustness to the loss computation. This may include factoring in uneven distribution of vector values through an angle-based assessment between the vectors.

In some examples, the contrastive loss function for adaptive margin computation per epoch(s) can enable granular image change detection. For example, this contrastive loss function can tune the extent of granularity desired by changing the "alpha" parameter in the loss function.

ML model may be trained until the expected output is reconstructed with loss errors within a threshold error value. A baseline may be derived that comprises the anchor image and minimal loss value threshold used during inference.

At block 730, the trained ML model may be deployed with the baseline at the inference environment. The trained ML model may be used for granular change detection and/or anomaly detection.

For granular change detection, the ML model may receive new images (not used during training) that are provided along with the anchor image to the ML model as a pair. The ML model outputs a similarity value between 0 to 1 where values towards 0 indicates dissimilar pair and towards 1 as a dissimilar pair. The images are now graded as values ranging from 0 to 1 indicating a fine tuning degree of similarity rather than a binary similar or dissimilar output. Associated dissimilarity values of these anomalous images can indicate the extent of change in the images.

These images may be provided to a visual depictable format that highlights the important features contributing to the change. One example of a visual depictable format includes using an existing image similarity measure such as Structural Similarity Index Measure (SSIM), which is provided for illustrative purposes and should not be limiting.

For anomaly assessment, the latent space of the CAE may be extracted from the encoder module on the data batches. A clustering technique may be initiated (e.g., such as Affinity Propagation) on the latent space of the encoder. Anomalies at inference may be used to generate a separate cluster. Anomalies may include, for example, low density data values with a far distance from the baseline).

As described with granular change detection, the images may be provided to a visual depictable format that highlights the important features contributing to the change. One example of a visual depictable format includes using an SSIM, which is provided for illustrative purposes and should not be limiting.

At block 740, similarities or differences are determined from the newly received images during an inference phase. For example, the system may implement a Siamese Auto-Encoder to determine a quantitative separation between the pairs of images that can be clustered for anomaly assessment. In some examples, the Siamese AutoEncoder provides an ordered list of prediction values ranging from highly similar (close to 1.0) to very dissimilar (close to 0.0). Additionally, the Siamese AutoEncoder can further provide a trend plot of the prediction values for a batch of images that helps a user in assessing rapidity of degradation based on the slope of the trend line.

At block 750, determine classification based on similarities or differences and provide the classification output. For example, the system may use a distance measure using a Euclidean distance between the outputs of the decoder networks in combination with a Cosine distance on latent space of the encoder portion of autoencoder networks. The distance measure can enable a greater loss assessment. In other examples, the system can correlate the highest similarity value with a classification of medical disease and provide the classification to a user interface along with one or more supporting images received during the inference phase.

In some examples, the classification output may be generated using an image processing technique. For example, one or more images with similarities or differences can be provided to the image processing technique to generate images with boxed highlighting of changes or as heatmaps.

Figure 9:
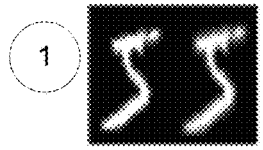
FIG. 9 illustrates processed images, in accordance with an example of the present disclosure.
Figure 9:
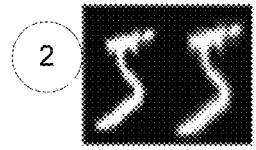
Figure 9:
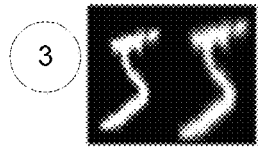
Figure 9:
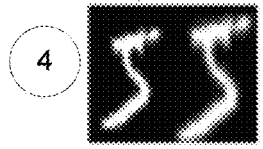
Figure 9:
Figure 9:
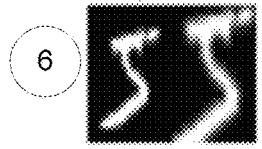
Figure 9:
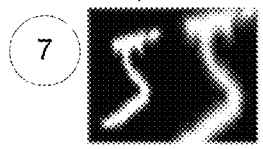
Figure 9:
Figure 9:
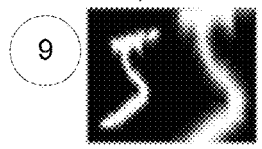
Figure 9:
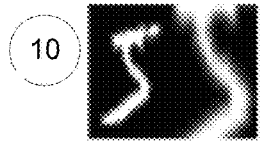
Figure 9:
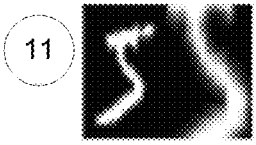
Figure 9:
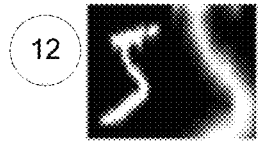
Figure 9:
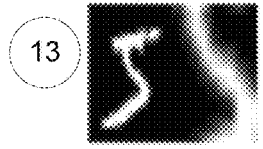
Figure 9:
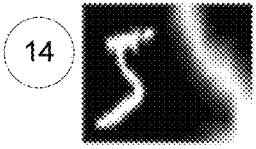
Figure 9:
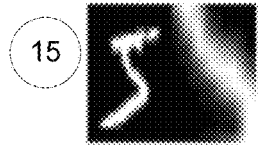
Figure 10:
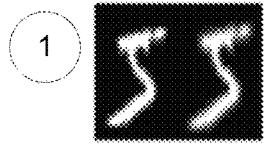
FIG. 10 illustrates processed images, in accordance with an example of the present disclosure.
Figure 10:
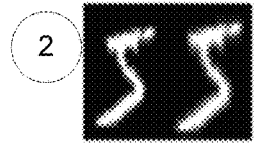
Figure 10:
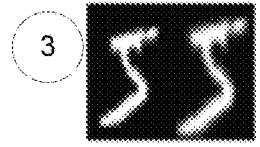
Figure 10:
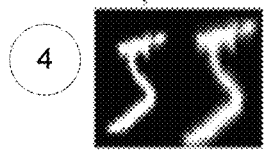
Figure 10:
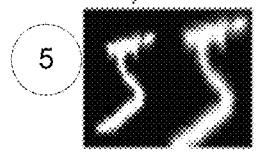
Figure 10:
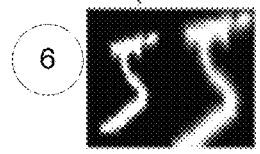
Figure 10:
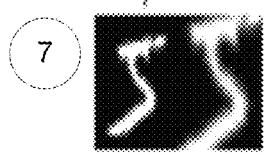
Figure 10:
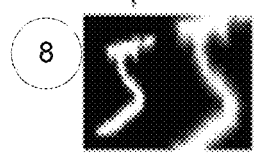
Figure 10:
Figure 10:
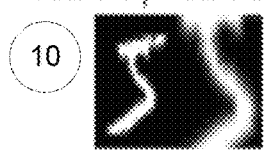
Figure 10:
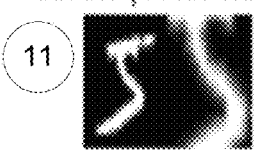
Figure 10:
Figure 10:
Figure 10:
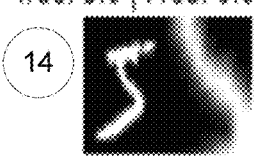
Figure 10:

Various image comparisons and image processing techniques are illustrated in FIGS. 9 and 10 using the ML models discussed herein. For example, FIG. 9 illustrates the use of a contrastive loss function with a Siamese Convolutional Neural Network and FIG. 10 illustrates the adaptive loss function with a Siamese AutoEncoder. The systems and methods described herein can perform a gradual change detection by ranking the images shown in these illustrations. The ranking may be based on a probability and/or prediction value that does not constrain the images to separation (e.g., using an adaptive margin) and can highlight feature changes across gradually changing images using image distance separation techniques (e.g. Structural Similarity Index Measure or "SSIM") and an enhanced contrastive loss function with a dynamically computed adaptive margin across the images.

In each of FIGS. 9 and 10, fifteen images input images are shown of the digital number "5," which have gradual degradation characteristics. The fifteen images are provided as input to models described herein for predicting and measuring a similarity with an anchor image. Predictions may be indicated as "True" for the same input and anchor image digit or "False" (or other binary metrics). In some examples, the prediction values may vary from 1.0 to 0.0, which can reflect the confidence value of similarity in predictions against the anchor image. A "High" confidence prediction values may corresponded with "1.0" or otherwise indicate a high similarity, while a "Low" confidence prediction value may correspond with "0.0" or otherwise indicate a low similarity or high dissimilarity.

FIG. 9 indicates use of the existing contrastive loss function technique with a Siamese Convolutional Neural Network (CNN). From image one to image eleven, it is observed that the prediction values are approximately same around 0.998 indicating high confidence even for degrading images. Significant sudden changes may be observed in prediction values from image eleven to image fifteen that have significant degradation with the prediction values ranging from 0.974 to 0.0004.

FIG. 10 indicates use of the SAE employing the adaptive loss function. Across image one to image fifteen, the techniques described herein may aptly detect gradually degrading images with granular prediction values. For example, across image one to image fifteen, the image may continue to degrade. Hence, smooth and granular degradation is detected with prediction values from 0.995 to 0.058, as illustrated.

Figure 11:
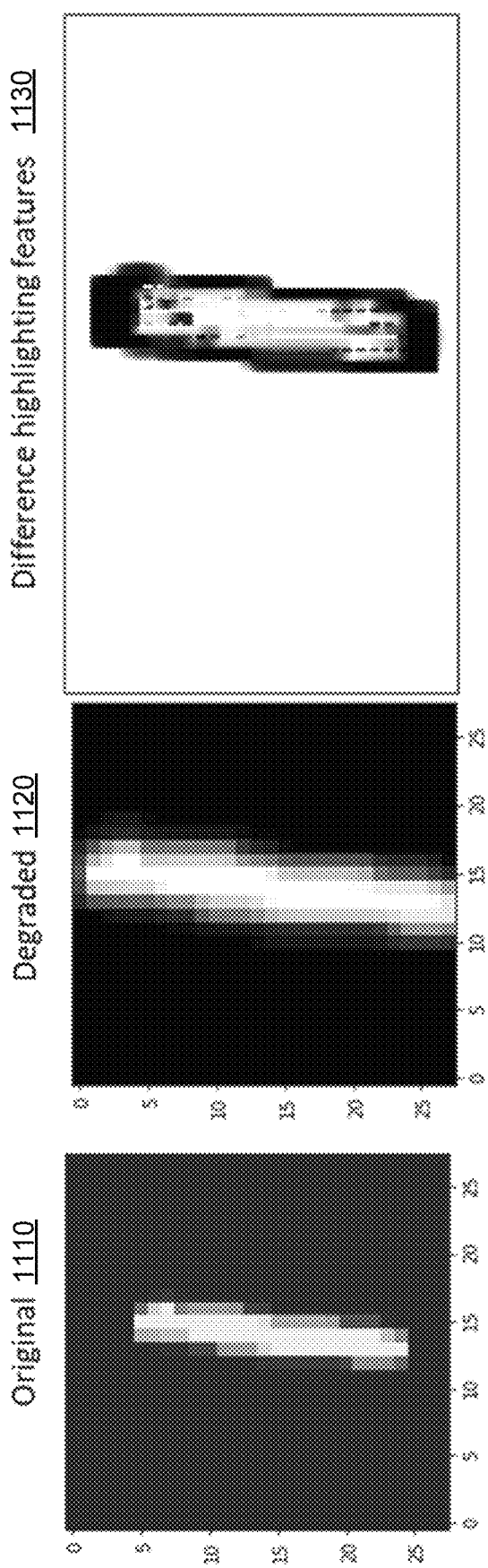
FIG. 11 illustrates a visualization of the important features contributing the degradation taking the original image and a degraded sample digit, in accordance with an example of the present disclosure.

FIG. 11 illustrates a visualization of the important features contributing the degradation taking the original image and a degraded sample digit, in accordance with an example of the present disclosure. In this example, original image 1110, degraded image 1120, and highlighted differences image 1130 are provided. While the compared images are provided for demonstration purposes, the system may receive other image types (e.g., in healthcare use cases, smart manufacturing, etc.).

An example of the invention may be an article of manufacture in which a machine-readable medium (such as microelectronic memory) has stored thereon instructions which program one or more data processing components (generically referred to here as a "processor") to perform the operations described above. In other examples, some of these operations might be performed by specific hardware components that contain hardwired logic (e.g., dedicated digital filter blocks and state machines). Those operations might alternatively be performed by any combination of programmed data processing components and fixed hardwired circuit components.

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

As used in the present specification, the term "machine learning" refers broadly to an artificial intelligence technique in which a computer's behavior evolves based on empirical data. In some cases, input empirical data may come from databases and yield patterns or predictions thought to be features of the mechanism that generated the data. Further, a major focus of machine learning is the design of algorithms that recognize complex patterns and makes intelligent decisions based on input data. Machine learning may incorporate a number of methods and techniques such as; supervised learning, unsupervised learning, reinforcement learning, multivariate analysis, case-based reasoning, backpropagation, and transduction.

In the above description and figures, some example and/or implementations of systems and/or methods for updating an ML model are described. As used herein, cloud server may be employed to provide a service, such as data processing, data communication, data storage, or any other product or activity that may be capable of running on the cloud server, or a cloud-based service. As used herein, the cloud server may be any appropriate combination of physical and virtual resources pooled for computing and/or storage purposes. For example, the cloud server may include any appropriate number of individual resources, servers, and server groups including virtual instances of resources, servers, and server groups. The cloud server may include any appropriate number of clouds and/or other network of resources accessible by the edge device.

Edge device may correspond to a device capable of processing images received from data sources such as mobile devices, desktops, laptops, tablets, internet of things (IoT) devices, medical equipment, robots, etc. The edge device may execute applications that include artificial intelligence/Machine Learning (ML) models. In some implementations, the edge device may process images using trained ML model, for generation of prediction data, confidence scores, and/or performance scores.

Implementations described hereinabove provide a system for ML model management, ML model deployment, ML model feedback collection, ML model re-training, etc. in support of applications executable on the edge device. ML models may be selected and deployed based on characteristics shared between the edge device and other edge systems, and/or the cloud server. Information received from the edge device may be used to update/re-train instances of ML models, and the ML models may be tracked, documented, and stored such that ML models may be specifically managed and customized for a single edge device, a group of edge device, etc. ML models are continuously or periodically monitored for accuracy, updated based on information, and deployed on various edge device.

A computer network providing communication between the edge device and the cloud server may be implemented using wired and/or wireless communication technologies. The computer network may comprise various network components such as switches, Provide Edge (PE) routers, Customer Edge (CE) routers, intermediate routers, bridges, computers, servers, and the like. The network devices present in the computer network may implement an Interior Gateway Protocol (IGP) including, but not limited to, Open Shortest Path First (OSPF), Routing Information Protocol (RIP), Intermediate System to Intermediate System (IS-IS), and Enhanced Interior Gateway Routing Protocol (EIGRP).

An interface may be used to provide input or fetch output from the system. The interface may be implemented as a Command Line Interface (CLI), Graphical User Interface (GUI). Further, Application Programming Interfaces (APIs) may also be used for remotely interacting with edge devices and cloud servers.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 12:
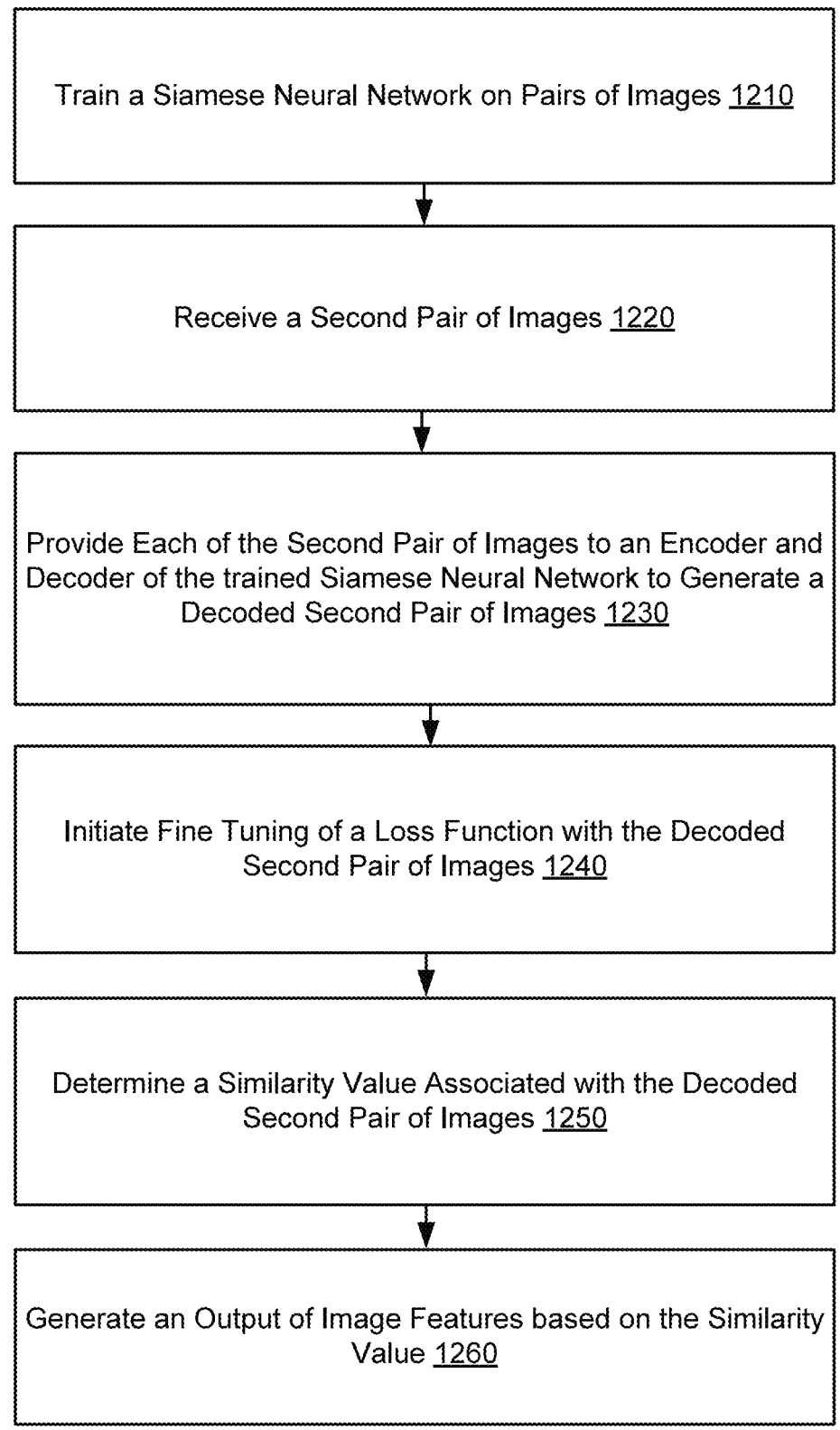
FIG. 12 illustrates a process for implementing a Siamese AutoEncoder using improved sub neural networks and loss function model, in accordance with an example of the present disclosure.
Figure 13:
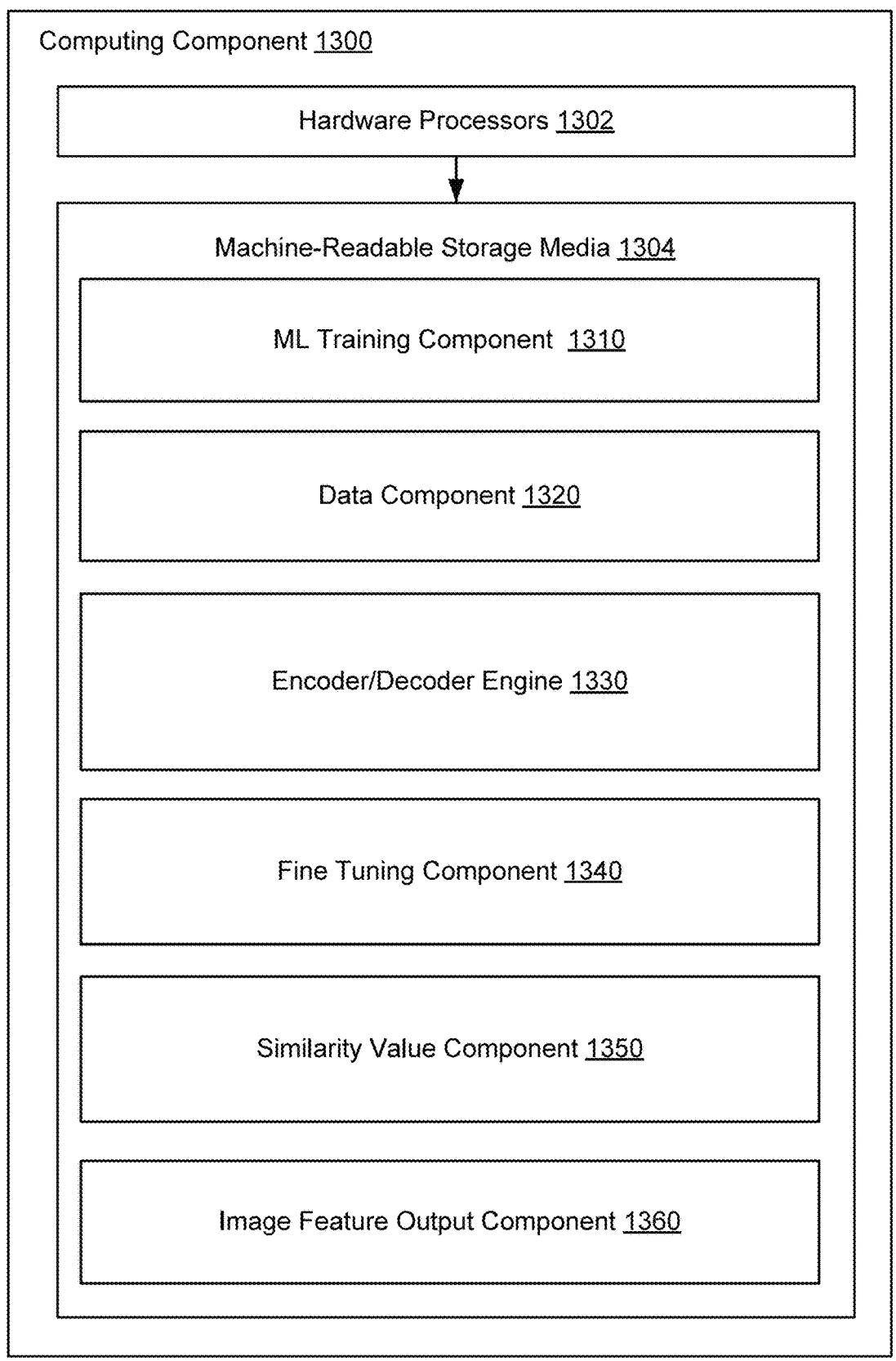
FIG. 13 is an example computing component that may be used to implement various features of examples described in the present disclosure.

FIG. 12 illustrates an example process that may be implemented by computing components discussed herein, including the computing components illustrated in FIG. 13. As illustrated in FIG. 13, computing component 1300 may comprise hardware processor 1302 and machine-readable storage medium 1304 for executing instructions to perform the process illustrated in FIG. 12.

Hardware processor 1302 may be one or more central processing units (CPUs), semiconductor-based microprocessors, and/or other hardware devices suitable for retrieval and execution of instructions stored in machine-readable storage medium. The hardware processor may fetch, decode, and execute instructions from various components, such as components 1310-1360, to control processes or operations for image change detection. As an alternative or in addition to retrieving and executing instructions, hardware processor 1302 may include one or more electronic circuits that include electronic components for performing the functionality of one or more instructions, such as a field programmable gate array (FPGA), application specific integrated circuit (ASIC), or other electronic circuits.

Machine-readable storage medium 1304 may be any electronic, magnetic, optical, or other physical storage device that contains or stores executable instructions. Thus, machine-readable storage medium 1304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 1304 may be a non-transitory storage medium, where the term "non-transitory" does not encompass transitory propagating signals.

Hardware processor 1302 of FIG. 13, using ML training component 1310, may execute instruction 1210 of FIG. 12 to train a Siamese AutoEncoder on one or more pairs of images.

Hardware processor 1302 of FIG. 13, using data component 1320 may execute instruction 1220 of FIG. 12 to receive a second pair of images.

Hardware processor 1302 of FIG. 13, using encoder/decoder engine 1330 may execute instruction 1230 of FIG. 12 to provide each of the second pair of images to an encoder and decoder of the trained Siamese AutoEncoder to generate a decoded second pair of images.

Hardware processor 1302 of FIG. 13, using fine tuning component 1340 may execute instruction 1240 of FIG. 12 to initiate fine tuning of a loss function with the decoded second pair of images.

Hardware processor 1302 of FIG. 13, using similarity value component 1350 may execute instruction 1250 of FIG. 12 to determine a similarity value associated with the decoded second pair of images.

Hardware processor 1302 of FIG. 13, using image feature output component 1360 may execute instruction 1260 of FIG. 12 to generate an output of image features based on the similarity value.

Figure 14:
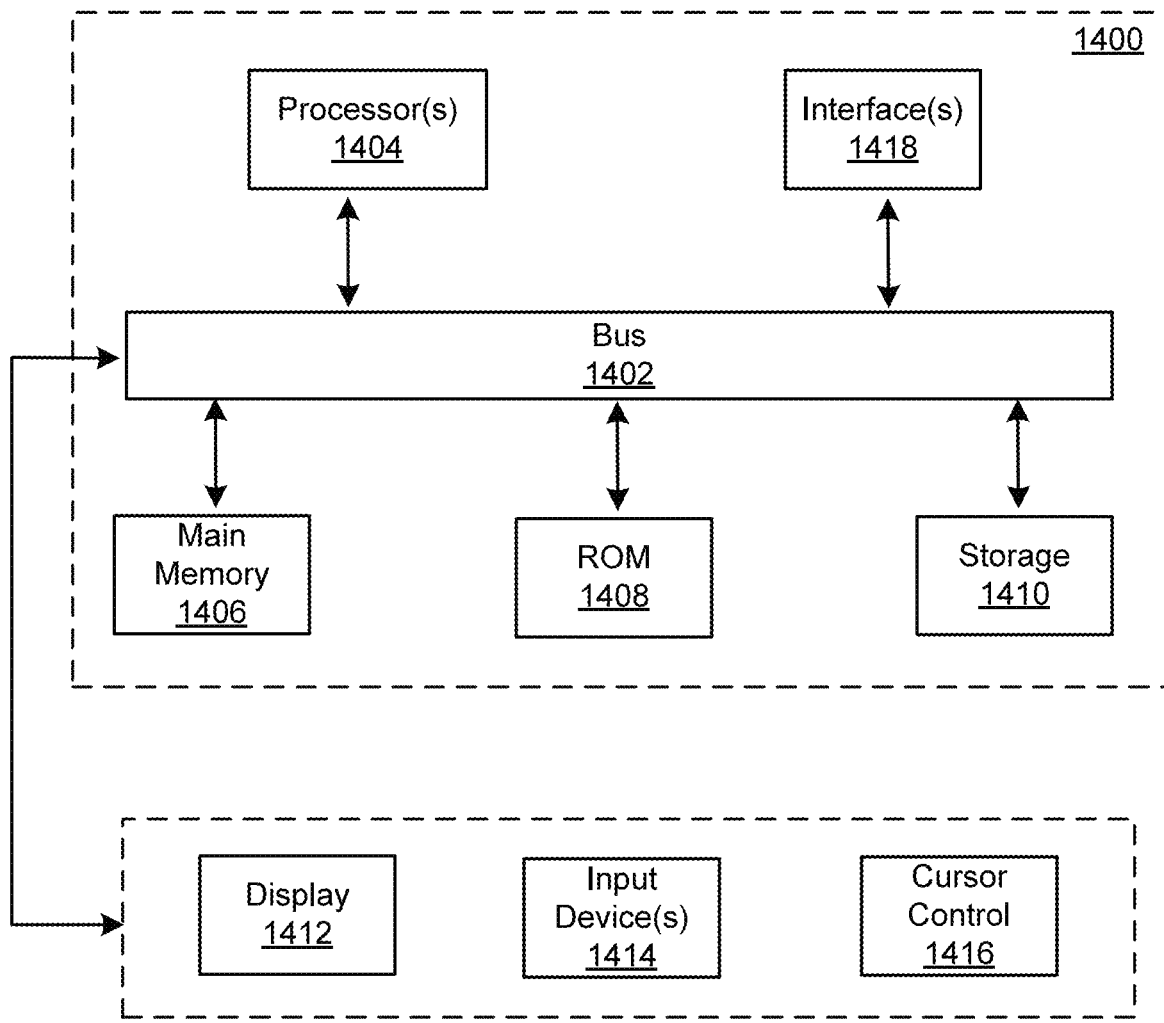
FIG. 14 depicts a block diagram of an example computer system in which various of the examples described herein may be implemented.

FIG. 14 depicts a block diagram of an example computer system 1400 in which various of the examples described herein may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some examples, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one example, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Communication interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network (s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device comprising:
   a memory; and
   one or more processors that are configured to execute machine readable instructions stored in the memory for performing a method comprising:
      initiating a training process of a Siamese AutoEncoder, wherein the Siamese AutoEncoder detects dissimilarities between a first pair of images, and wherein the Siamese AutoEncoder comprises two sub neural networks that are each configured to:
         generate a feature vector on the first pair of images to create two feature vectors of the first pair of images, and
         compare the two feature vectors to detect the dissimilarities;
      during the training process:
         receiving a second pair of images;
         providing the second pair of images to an encoder and a decoder of the Siamese AutoEncoder to generate a decoded second pair of images;
         initiating fine tuning of a first loss function and a second loss function with the decoded second pair of images, wherein the first loss function is an adaptive margin loss function that includes an upper margin value and a lower margin value and the second loss function is a contrastive loss function that uses the decoded second pair of images that are dissimilar within a margin value;
         determining a similarity value associated with the decoded second pair of images using the first loss function and the second loss function; and
         generating an output of image features based on the similarity value.

2. The computing device of claim 1, wherein the method further comprises:
   stabilizing an error loss value of the Siamese AutoEncoder using an upper water mark and a lower water mark; and in response to the stabilizing, deriving baseline data used for drift analysis of an edge device.

3. The computing device of claim 1, further comprising:
transmitting the trained Siamese AutoEncoder to a second computing device, wherein the second pair of images are received from an interface of the second computing device.

4. The computing device of claim 1, wherein the encoder further comprises a latent space, and wherein the method further comprises:
extracting the latent space of the encoder;
clustering the extracted latent space; and
determining an anomaly from the clustered latent space.

5. The computing device of claim 4, wherein the output of image features uses the determined anomaly from the clustered latent space.

6. The computing device of claim 4, wherein training the Siamese AutoEncoder on pairs of images uses an image separation distance computation.

7. The computing device of claim 1, wherein the loss function dynamically computes a margin alternative direction method (AdM) across epochs.

8. The computing device of claim 1, wherein the training process further comprises:
comparing the similarity value to a range of values that identify similar images at a first end of the range and dissimilar images at a second end of the range.

9. The computing device of claim 1, wherein the similarity value is a minimum value obtained from a similarity matrix.

10. The computing device of claim 1, wherein the training process further comprises:
stopping the training process when the output of image features is reconstructed with a loss error within a threshold error value.

11. A computer-implemented method comprising:
initiating a training process of a Siamese AutoEncoder, wherein the Siamese AutoEncoder detects dissimilarities between a first pair of images, and wherein the Siamese AutoEncoder comprises two sub neural networks that are each configured to:
generate a feature vector on the first pair of images to create two feature vectors of the first pair of images, and
compare the two feature vectors to detect the dissimilarities;
during the training process:
receive a second pair of images;
provide the second pair of images to an encoder and a decoder of the trained Siamese AutoEncoder to generate a decoded second pair of images;
initiate fine tuning of a loss function with the decoded second pair of images, wherein the loss function is an adaptive margin loss function that includes an upper margin value and a lower margin value;
determine a similarity value associated with the decoded second pair of images;
generate an output of image features based on the similarity value; and
stop the training process when the output of image features is reconstructed with a loss error within a threshold error value.

12. The computer-implemented method of claim 11, further comprising:
stabilizing an error loss value of the Siamese AutoEncoder using an upper water mark and a lower water mark; and
in response to the stabilizing, deriving baseline data used for drift analysis of an edge device.

13. The computer-implemented method of claim 11, further comprising:
transmitting the trained Siamese AutoEncoder to a second computing device, wherein the second pair of images are received from an interface of the second computing device.

14. The computer-implemented method of claim 11, wherein the encoder further comprises a latent space, and wherein the method further comprising:
extracting the latent space of the encoder;
clustering the extracted latent space; and
determining an anomaly from the clustered latent space.

15. The computer-implemented method of claim 14, wherein the output of image features uses the determined anomaly from the clustered latent space.

16. The computer-implemented method of claim 14, wherein training the Siamese AutoEncoder on pairs of images uses an image separation distance computation.

17. The computer-implemented method of claim 11, wherein the loss function dynamically computes a margin alternative direction method (AdM) across epochs.

18. A computer-implemented method comprising:
initiating a training process of training a Siamese AutoEncoder, wherein the Siamese AutoEncoder detects dissimilarities between a first pair of images, and wherein the Siamese AutoEncoder comprises two sub neural networks that are each configured to:
generate a feature vector on the first pair of images to create two feature vectors of the first pair of images, and
compare the two feature vectors to detect the dissimilarities;
during the training process:
receive a second pair of images;
provide the second pair of images to an encoder and a decoder of the Siamese AutoEncoder to generate a decoded second pair of images;
initiate fine tuning of a loss function with the decoded second pair of images, wherein the loss function is an adaptive margin loss function that includes an upper margin value and a lower margin value;
determine a similarity value associated with the decoded second pair of images;
generate an output of image features based on the similarity value; and
stop the training process of the Siamese AutoEncoder when the output of image features is reconstructed with a loss error within a threshold error value.

19. The computer-implemented method of claim 18, further comprising:
stabilizing an error loss value of the Siamese AutoEncoder using an upper water mark and a lower water mark; and
in response to the stabilizing, deriving baseline data used for drift analysis of an edge device.

20. The computer-implemented method of claim 18, further comprising:
transmitting the trained Siamese AutoEncoder to a second computing device, wherein the second pair of images are received from an interface of the second computing device.

* * * * *